(12) United States Patent
Kajiura

(10) Patent No.: US 6,366,050 B2
(45) Date of Patent: Apr. 2, 2002

(54) ELECTROMAGNETIC INDUCTION TYPE SUPPLY SIDE CHARGING APPARATUS AND ELECTROMAGNETIC INDUCTION TYPE CHARGING SYSTEM

(75) Inventor: Katsuyuki Kajiura, Kariya (JP)

(73) Assignee: Kabushiki Kaisha Toyoda Jidoshokki Seisakusho, Kariya (JP)

(\*) Notice: Subject to any disclaimer, the term of this patent is extended or adjusted under 35 U.S.C. 154(b) by 0 days.

(21) Appl. No.: 09/730,436

(22) Filed: Dec. 5, 2000

(30) Foreign Application Priority Data

Dec. 10, 1999 (JP) .............................. 11-352322

(51) Int. Cl.[7] .............................................. H01M 10/46
(52) U.S. Cl. ....................................................... 320/108
(58) Field of Search ................................. 320/104, 108; 336/DIG. 2

(56) References Cited

U.S. PATENT DOCUMENTS

| | | | |
|---|---|---|---|
| 5,461,299 A | | 10/1995 | Bruni |
| 5,850,135 A | * | 12/1998 | Kuki et al. ................. 320/108 |
| 5,909,099 A | * | 6/1999 | Watanabe et al. ........... 320/108 |
| 6,104,160 A | * | 8/2000 | Iwata et al. ............. 320/108 X |

\* cited by examiner

*Primary Examiner*—Edward H. Tso
(74) *Attorney, Agent, or Firm*—Woodcock Washburn LLP

(57) ABSTRACT

In an electromagnetic induction type supply side charger according to the present invention, a smoothing condenser and resonant coils, which are both relatively heavy or bulky, among electric/electronic devices which constitute a power conversion circuit formed on a power circuit board housed in a housing of the supply side charger, are secured to a cooling duct secured to the housing.

10 Claims, 5 Drawing Sheets

ELECTROMAGNETIC INDUCTION TYPE SUPPLY SIDE CHARGING APPARATUS AND ELECTROMAGNETIC INDUCTION TYPE CHARGING SYSTEM

BACKGROUND OF THE INVENTION

1. Field of the Invention

The present invention relates to an electromagnetic induction type supply side charging apparatus for charging a battery provided in a moving body, such as a vehicle, in an electromagnetic induction system, and an electromagnetic induction type charging system having such a supply side charging apparatus.

2. Description of the Related Art

Conventionally, an electromagnetic induction system has been adopted as a charging system for a battery, for example, in an electric vehicle. The electromagnetic induction type charging operation is carried out between a supply side charging apparatus installed on the ground and a receiving side charging apparatus provided in the vehicle. Upon charging, a supply side coupler element provided on the supply side charging apparatus is connected to a receiving side coupler element provided on the receiving side charging apparatus, so that electricity is supplied from the supply side coupler element to the receiving side coupler element in an electromagnetic induction system. High frequency current induced in the receiving side coupler element is converted into direct current and is used to charge a battery.

The supply side charging apparatus converts power-frequency voltage 200V AC into high voltage-high frequency AC and supplies the same to the supply side coupler element. To this end, as shown in FIG. 5, the conventional supply side charger 50 is comprised of a power circuit board 52 on which a power conversion circuit, composed of a rectifying/power factor improving circuit and a resonant converter, etc., is formed in a housing 51. The power circuit board 52 is provided thereon with electronic devices, such as a diode which constitutes the rectifying/power factor improving circuit, and a smoothing condenser 53, etc., and electronic devices such as an FET which constitutes a DC-AC converter, etc.

The housing 51 of the supply side charging apparatus 50 is in the form of a box elongated in the vertical direction to minimize the contact area with the ground. Consequently, the power circuit board 52 is also elongated in the vertical direction and is secured in the housing 51 in an upright position.

Among the electronic devices provided on the power circuit board 52, for example, the smoothing condenser 53 is greater in weight and volume than other electronic devices. Therefore, if the heavy condenser 53 is mounted to the vertically elongated power circuit board 52, the latter is deflected due to the weight. The deflection of the power circuit board 52 causes welded portions of electronic device mounted to the power circuit board 52 to be subject to stress. Consequently, there is a possibility that the electrical connection at the welded portions fails, thus resulting in a reduced reliability of the power circuit board 52.

To solve this problem, it can be considered that a plurality of small capacity condensers are interconnected in parallel to obtain a total capacity identical to that of one heavy condenser 53 to thereby reduce the load applied to the circuit board. However, the parallel connection of the plural condensers contrary to requirements of an increase in the packaging density and miniaturization of the circuit board.

Moreover, in an arrangement in which the plural condensers are interconnected in parallel, it is impossible to apply a load uniformly to the condensers, due to irregular characteristics of the condensers. Therefore, this arrangement is not preferable in view of provision of highly reliable electric characteristics.

SUMMARY OF THE INVENTION

It is an object of the present invention to provide an electromagnetic induction type supply side charging apparatus in which the reliability of electric functions of a circuit board on which a power conversion circuit is formed can be enhanced, and an electromagnetic induction type charging system having the supply side charging apparatus.

To achieve the object mentioned above, according to an aspect of the present invention, there is provided an electromagnetic induction type supply side charging apparatus in which a power circuit board on which a power conversion circuit is formed to convert the AC of a power source into a high frequency AC is provided in a housing, so that the electric power obtained from the power source AC is supplied in an electromagnetic induction system wherein, among electric/electronic devices which constitute the power conversion circuit, one or more electric/electronic device or devices which is or are relatively heavy or bulky is or are secured to the housing or a structure body secured thereto.

With this arrangement of the invention, it is possible to prevent the power circuit board from being continuously subject to an extraordinarily large bending force due to a relatively heavy or bulky electric/electronic devices, and hence the power circuit board on which the power conversion circuit is formed tends not to be unusually deflected. Consequently, the welded portions of the electric/electronic devices mounted on the power circuit board are not continuously subject to an extraordinary stress, so that no failure of the electric connection at the welded portions of the electric/electronic devices tends to occur.

The present invention may be more fully understood from the description of preferred embodiments of the invention set forth below, together with the accompanying drawings.

DESCRIPTION OF THE PREFERRED EMBODIMENTS

The invention will be discussed below with reference to the accompanying drawings which show an embodiment of the present invention.

Figure 2:
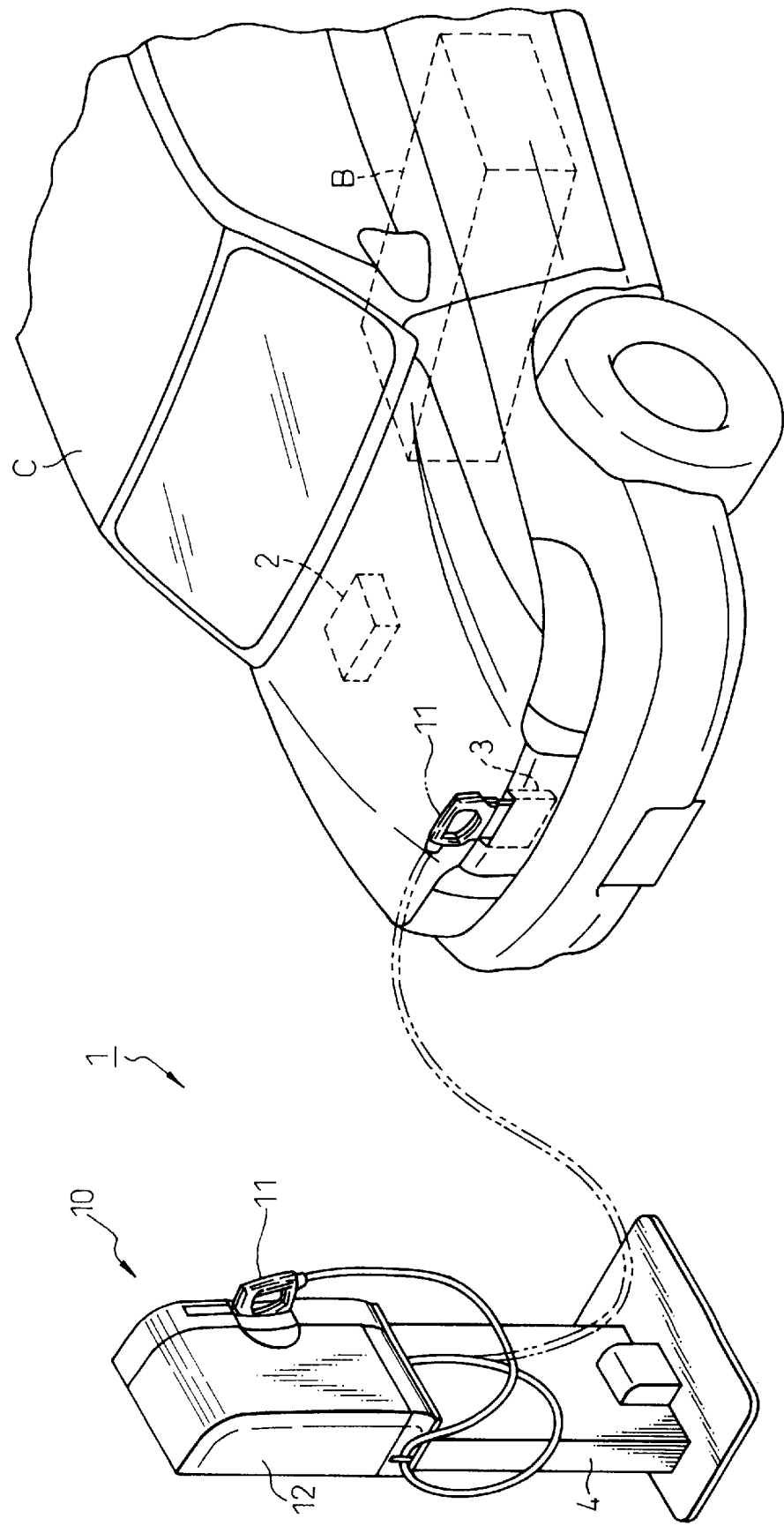
FIG. 2 is a schematic structural view of an electromagnetic induction type charging system.

As can be seen in FIG. 2, an electromagnetic induction type charging system 1 is installed in a predetermined charging station, and is comprised of a supply side charging apparatus 10 which supplies electric power to an external device from a main power source in an electromagnetic induction system, and a receiving side charging apparatus 2 which is provided in an electric vehicle C and which receives the electric power supplied from the supply side charging apparatus 10 in an electromagnetic induction system to charge a battery B provided in the electric vehicle C. The receiving side charging apparatus 2 is provided with a receiving side coupler element 3 which is adapted to receive the electric power supplied from the supply side charging apparatus 10.

Figure 3:
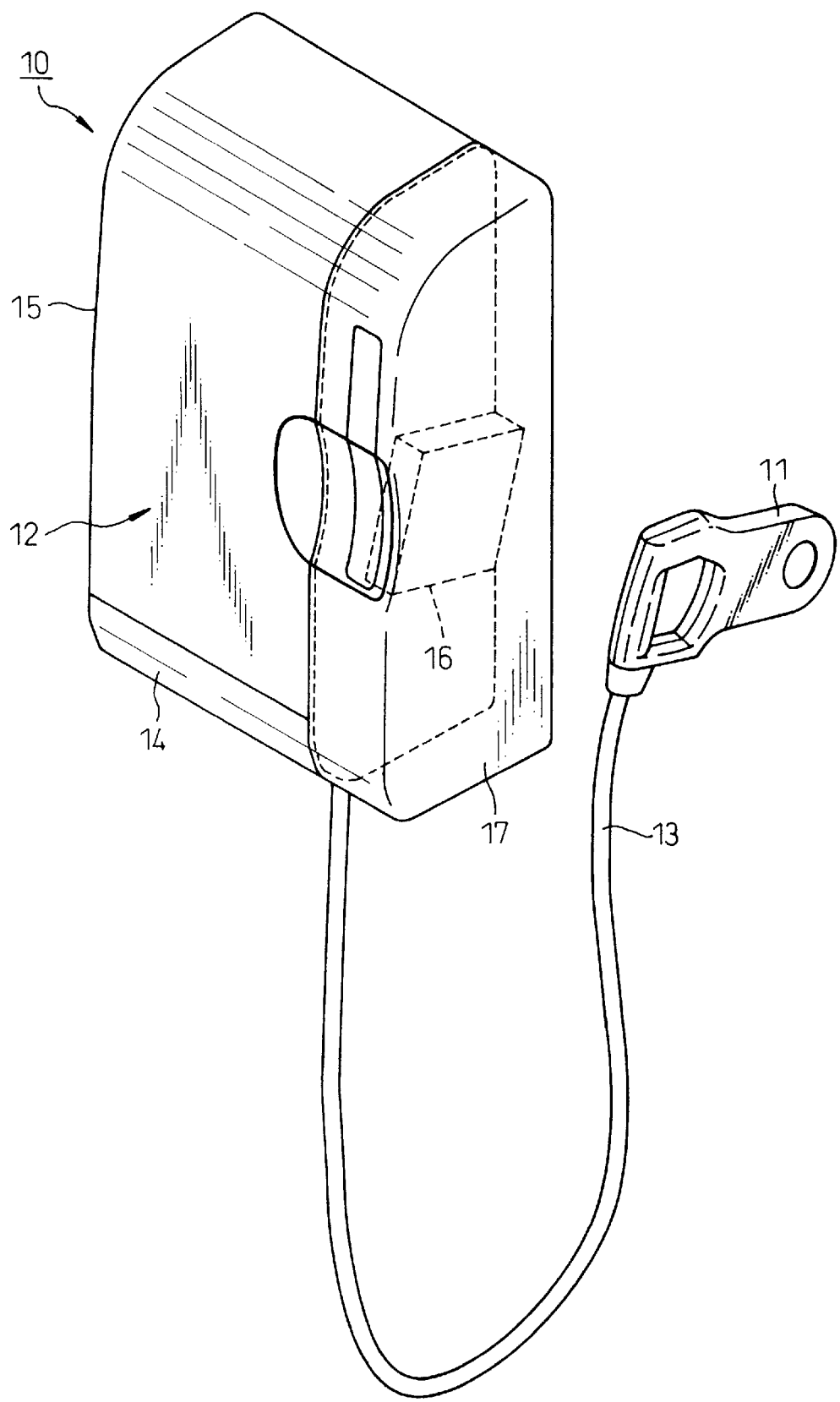
FIG. 3 is an enlarged perspective view of an electromagnetic induction type charging system.

As shown in FIG. 3, the supply side charging apparatus 10 is provided with a supply side coupler element 11 which can be connected to the receiving side coupler element 3. The supply side coupler element 11 is connected to a main body 12 by means of a cable 13.

The main body 12 of the supply side charging apparatus 10 is comprised of a lower frame 17 which defines a lower part thereof, a body cover 15 which is secured to the lower frame 14, and a coupler cover 17 which covers a coupler receptacle 16 formed on the right side surface of the body cover 15. The supply side charging apparatus 10 is installed so that the lower frame 14 is secured to a support base 4 (FIG. 2). The coupler receptacle 16 is adapted to receive the supply coupler element 11 when it is not used. In the illustrated embodiment, the lower frame 14 and the body cover 15 constitute a housing.

Figure 1:
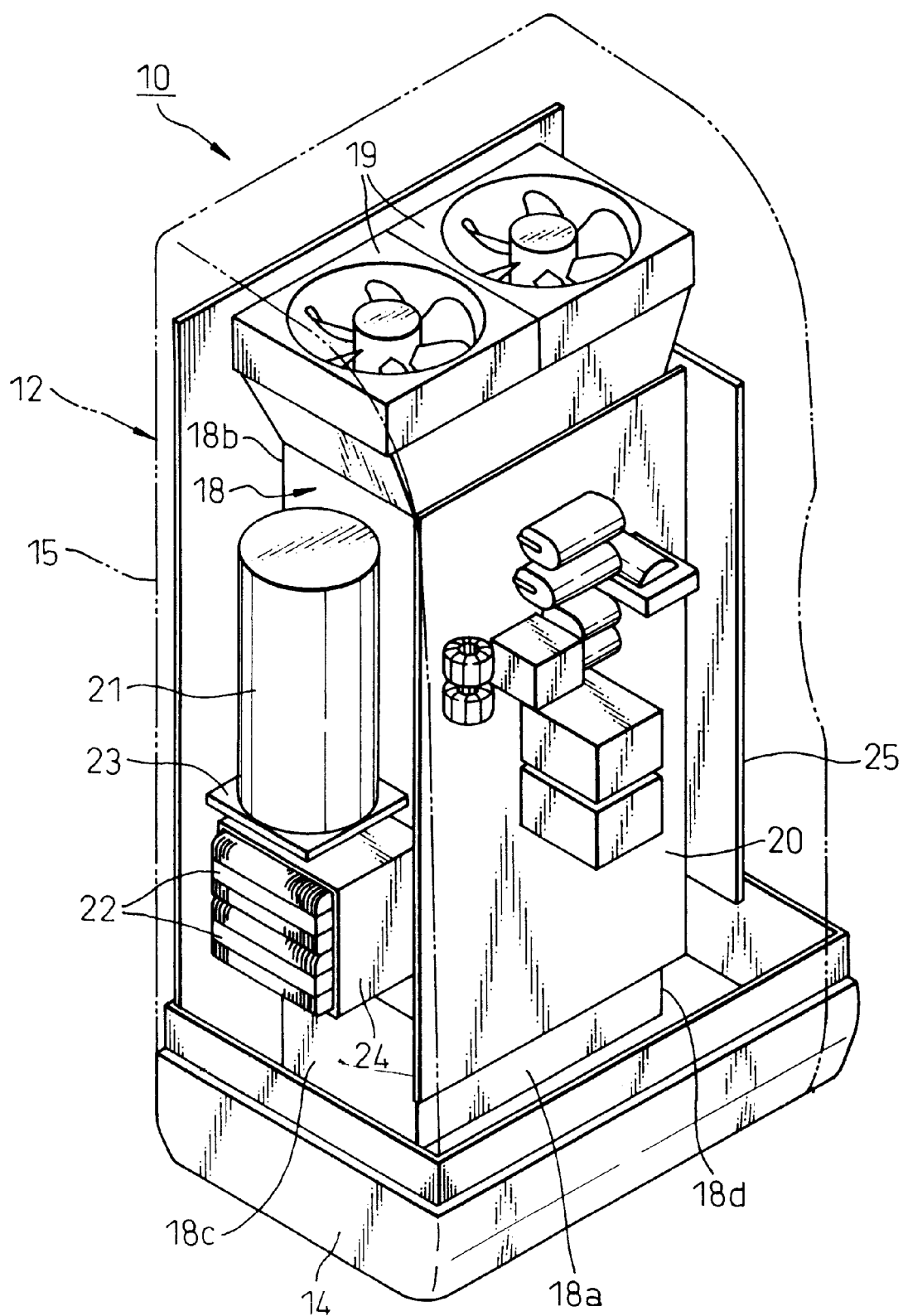
FIG. 1 is a schematic perspective view of an electromagnetic induction type supply side charging apparatus, according to the present invention.
Figure 4:
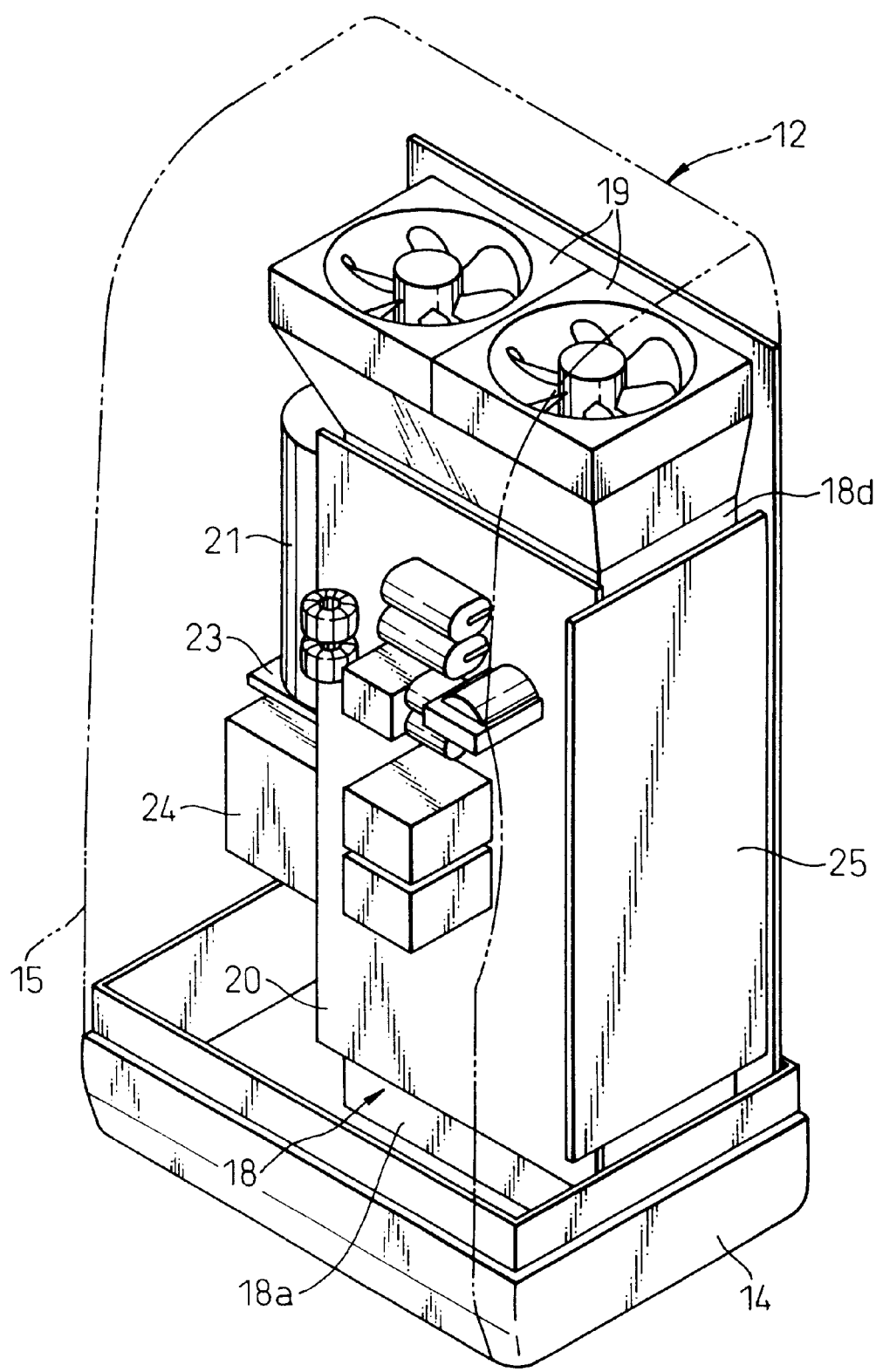
FIG. 4 is a schematic perspective view of an electromagnetic induction type supply side charging apparatus according to the present invention.
Figure 5:
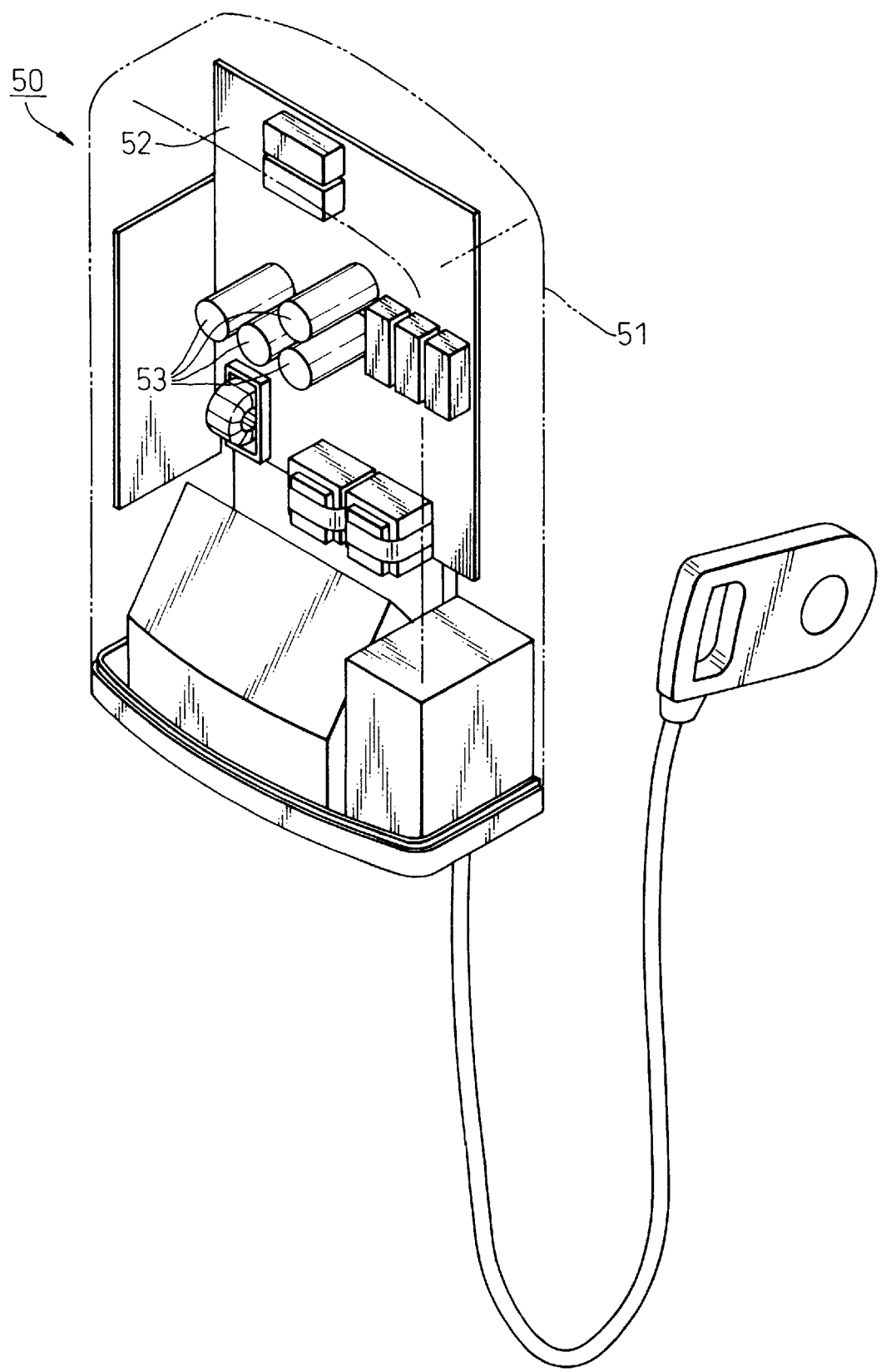
FIG. 5 is a schematic perspective view of a known electromagnetic induction type supply side charging apparatus.

As shown in FIGS. 1 and 4, a cooling duct 18 in the form of a rectangular tube is provided on the lower frame 14. The cooling duct 18 is made of aluminum alloy and is provided with a lower opening which opens into the air through an opening (not shown) formed in the frame 14. Motor-driven fans 19 are provided at an upper opening of the cooling duct 18. The motor-driven fans 19 are adapted to introduce an ambient air through an opening (not shown) formed on the portion of the lower frame 14 that is located in front of the cooling duct 18 into the body cover 15 and feed the air into the cooling duct 18 through the outside of the cooling duct 18. The air fed into the cooling duct 18 passes therein and is discharged from the opening of the lower frame 14 through the duct 18. Consequently, the front surface 18a, the rear surface 18b and the left and right side surfaces 18c and 18d, of the duct 18 are cooled by the air passing in the duct 18.

A power circuit board 20 is secured to the cooling duct 18 through a bracket (not shown), so that the circuit board 20 is opposed to and in parallel with the front surface 18a of the duct 18. The power circuit board 20 is provided with a power conversion circuit formed thereon, which converts the power-frequency AC into high-voltage and high frequency AC. The power conversion circuit is per se known and is comprised of a rectifying/power factor improving circuit and a resonant converter. The rectifying/power factor improving circuit is provided with a diode bridge circuit, a smoothing condenser 21, etc. The single smoothing condenser 21 is separately provided. The resonant converter is provided with a FET (Field Effect Transistor) bridge circuit and resonant coils 22, etc. The supply side coupler element 11 is connected to the output terminal of the power conversion circuit through the cable 13. In the illustrated embodiment, the smoothing condenser 21 and the resonant coils 22 are electric/electronic parts.

Among the electronic parts of the power conversion circuit, the smoothing condenser 21, which is relatively heavy and bulky, is secured to a bracket 23 provided on the left side surface 18c of the cooling duct 18.

Likewise, among the electronic parts of the power conversion circuit, the pair of resonant coils 22 which are relatively heavy and bulky are secured to a bracket 24 provided on the left side surface 18c of the cooling duct 18.

The supply side charging apparatus 10 is provided with a charge control circuit board 25 having a charge controller which controls the charge state. The charge control circuit board 25 is secured to the right side surface 18d of the cooling duct 18 through a bracket (not shown), so that the circuit board 25 is opposed to and in parallel with the right side surface 18d. The charge controller is comprised of a microcomputer or the like, and controls the rectifying/power factor improving circuit and the resonant converter in accordance with a control signal from the supply side charging apparatus.

The operation and advantages of the supply side charging apparatus constructed as above are as follows.

(1) In the illustrated embodiment, the smoothing condenser 21 and the resonant coils 22, both of which are relatively heavy and bulky, are secured to the cooling duct 18 through the brackets 23 and 24, respectively, without being directly mounted to the power circuit board 20. Consequently, the load applied to the power circuit board 20 is reduced and thus, no deflection thereof takes place. As a result, no failure of electrical connection at the welded portions of the electronic devices mounted to the circuit board 20 due to the deflection of the circuit board 20 occurs.

(2) In the illustrated embodiment, the smoothing condenser is made of a single condenser (smoothing condenser 21) and is secured to the cooling duct 18 through the bracket 23 without being directly mounted to the power circuit board 20. Consequently, the mounting surface area of the power circuit board 20 can be reduced due to absence of the smoothing condenser 21 thereon and, accordingly, the circuit board 20 can be made small.

(3) In the illustrated embodiment, since the power circuit board 20 extends along the front surface 18a of the cooling duct 18, the power circuit board 20 can be effectively cooled by the cooling duct 18.

(4) In the illustrated embodiment, since the charge control circuit board 25 extends along the right side surface 18d of the cooling duct 18, the charge control circuit board 25 can be effectively cooled by the cooling duct 18.

(5) In the illustrated embodiment, the power circuit board 20 is arranged on the front surface 18a of the cooling duct 18; the smoothing condenser 21 and the resonant coils 22 are arranged on the left side surface 18c thereof and; the charge control circuit board 25 is arranged on the right side surface 18d, respectively. Namely, electric and electronic parts or devices are regularly arranged around the cooling duct 18. Therefore, the body 12 of the supply side charging apparatus 10 can be made small.

Modified embodiments of the present invention will be discussed below.

The electric or electronic device or part to be secured to the structure body is not limited to the smoothing condenser 21 or the resonant coils 22. For instance, in the case that the power circuit board is provided with a power conversion circuit which is in turn provided with a transformer circuit which changes the voltage of AC power source, it is possible to secure the transformer to the structure body.

The structure body is not limited to the cooling duct 18 which is adapted to cool the power circuit board 20 and the charge control circuit board 25, and may be the frame 14 as a housing or the body cover 15.

The structure can be a support member as a structure which is secured to the lower frame 14 to support the electric and electronic devices.

Moreover, the smoothing condenser to be secured to the structure is not limited to a single condenser, but can be alternatively made of a plurality of condensers connected in parallel. In this alternative, the reliability of the power circuit board 20 can be enhanced.

According to the present invention, the electric reliability of the power circuit board in which the power conversion circuit is formed can be enhanced.

Furthermore, according to the present invention, the mounting surface area of the power circuit board can be reduced and hence the power circuit board can be made small.

In addition to the foregoing, according to the present invention, the electric and electronic devices of the power conversion circuit including the power circuit board can be effectively cooled.

Moreover, according to the present invention, the charge control circuit board on which the charge control circuit is formed to control the power conversion circuit can be effectively cooled.

While the invention has been described by reference to specific embodiments chosen for purposes of illustration, it should be apparent that numerous modifications could be made thereto by those skilled in the art without departing from the basic concept and scope of the invention.

I claim:

1. An electromagnetic induction type supply side charging apparatus in which a power circuit board on which a power conversion circuit is formed to convert the AC of a power source into a high frequency AC is provided in a housing, so that the electric power obtained from the power source AC is supplied in an electromagnetic induction system, wherein among electric/electronic devices which constitute the power conversion circuit, one or more electric/electronic device or devices which is or are relatively heavy or bulky is or are separately secured to at least one of the housing and a structure body secured thereto without being directly mounted to the power circuit board.

2. An electromagnetic induction type supply side charging apparatus according to claim 1, wherein said electric/electronic device is a smoothing condenser provided in a rectifying/power factor improving circuit of the power conversion circuit or a resonant coil provided in a resonant converter of the power conversion circuit.

3. An electromagnetic induction type supply side charging apparatus according to claim 2, wherein said smoothing condenser is made of a single condenser.

4. An electromagnetic induction type supply side charging apparatus according to claim 3, wherein said structure body is a cooling duct in the form of a rectangular tube, so that said power circuit board is provided on a front surface of the cooling duct and said smoothing condenser and the resonant coil are arranged on a side surface of the cooling duct.

5. An electromagnetic induction type supply side charging apparatus according to claim 4, wherein a charge control circuit board on which a charge control circuit is formed to control the power conversion circuit is arranged on a side surface of the cooling duct opposed to the side on which said smoothing condenser and said resonant coil are arranged.

6. An electromagnetic induction type charging system comprising an electromagnetic induction type supply side charging apparatus according to claim 1, and a receiving side charging apparatus which receives electric power supplied from the supply side charging apparatus in an electromagnetic induction system to charge a battery.

7. An electromagnetic induction type charging system comprising an electromagnetic induction type supply side charging apparatus according to claim 2 and a receiving side charging apparatus which receives electric power supplied from the supply side charging apparatus in an electromagnetic induction system to charge a battery.

8. An electromagnetic induction type charging system comprising an electromagnetic induction type supply side charging apparatus according to claim 3 and a receiving side charging apparatus which receives electric power supplied from the supply side charging apparatus in an electromagnetic induction system to charge a battery.

9. An electromagnetic induction type charging system comprising an electromagnetic induction type supply side charging apparatus according to claim 4 and a receiving side charging apparatus which receives electric power supplied from the supply side charging apparatus in an electromagnetic induction system to charge a battery.

10. An electromagnetic induction type charging system comprising an electromagnetic induction type supply side charging apparatus according to claim 5 and a receiving side charging apparatus which receives electric power supplied from the supply side charging apparatus in an electromagnetic induction system to charge a battery.

* * * * *